H. L. WORBOIS.
CLUTCH.
APPLICATION FILED MAY 3, 1917.
1,361,511.
Patented Dec. 7, 1920.
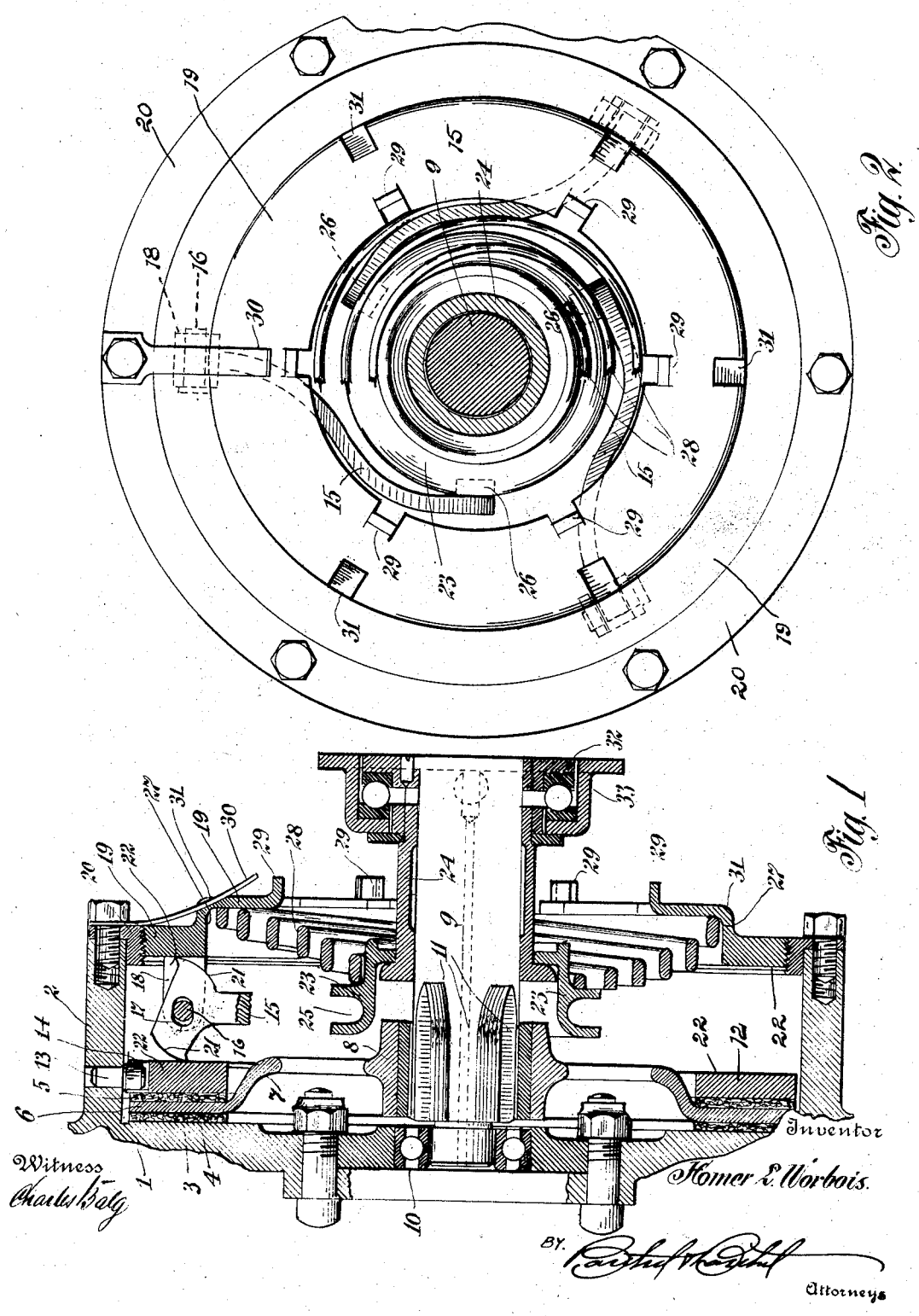

UNITED STATES PATENT OFFICE.

HOMER L. WORBOIS, OF DETROIT, MICHIGAN.

CLUTCH.

1,361,511.  Specification of Letters Patent.  Patented Dec. 7, 1920.

Application filed May 3, 1917. Serial No. 166,139.

*To all whom it may concern:*

Be it known that I, HOMER L. WORBOIS, a citizen of the United States of America, residing at Detroit, in the county of Wayne and State of Michigan, have invented certain new and useful Improvements in Clutches, of which the following is a specification, reference being had therein to the accompanying drawings.

This invention relates particularly to that class of clutches which are adapted for use in motor vehicle constructions and its object is to provide a simple and efficient construction which is cheap to manufacture and will take a minimum of space. A further object is to provide simple means for adjusting the parts to provide for wear which adjustment is such that it may be accomplished without special tools and without disassembling or dismantling the structure, it only being necessary to remove the cover plate of the inclosing casing which is usually provided. It is also an object of the invention to provide a peculiar construction of operating spring and arrangement of parts whereby the over-all length of the device is minimized.

With these and other ends in view, the invention consists in the matters hereinafter more fully set forth and particularly pointed out in the appended claims, reference being had to the accompanying drawing in which—

Figure 1 is a longitudinal vertical section through a device illustrative of the invention, and Fig. 2 is a sectional end elevation of the same.

As shown in the drawing 1 represents a portion of a fly wheel of an engine or a disk adapted to be bolted thereto, which wheel or disk is provided with an annular flange 2 forming a casing for a series of friction rings, one of which bears against an inner flat friction end surface 3 on the wheel. These friction ring disks comprise two rings 4 and 5 of fiber or other suitable material, between which is a metal ring 6 formed with a spider 7 and hub 8 by means of which it is supported upon and made fast to the driven shaft 9 supported in axial alinement with the fly wheel by a ball bearing 10 in the wheel, in the usual manner. This friction disk 6 is connected to the shaft to turn therewith by means of ribs 11 formed on the shaft or it may be keyed thereto in any other suitable manner to permit its free endwise movement thereon.

To force the rings 4 and 5 into contact with the ring 6 and the ring 4 into firm frictional engagement with the surface 3 of the fly wheel, and cause the transmission of motion from said wheel to the driven shaft through said disk 6 thereon, a master ring 12 is provided to engage the outer side of the ring 5. This ring 12 is connected to the flange 2 to rotate with the fly wheel, by one or more pins 13 on the flange each having a head to engage a transverse slot 14 in the periphery of the ring. Said ring is thus free to move toward and from the friction rings while being carried and rotated by the fly wheel flange. A plurality of levers 15 having T-shaped outer ends are pivotally supported by pins 16 passing through elongated holes 17 in the T-heads and through ears 18 on an adjustable plate 19 provided with a peripheral screw-thread to engage an internally screw-threaded ring 20 bolted to the rear edge of the flange 2. The oppositely extending arms of each lever 15 are formed with eccentric end surfaces 21 to engage opposed flat surfaces 22 on the master ring 12 and plate 19, and said levers extend inwardly to engage a suitable collar 23 surrounding a sleeve 24 on the driven shaft 9. This collar has a groove 25 to receive rollers 26 on the ends of the levers, which levers are preferably bent or offset to extend approximately one quarter of the distance around the collar so that each will engage the groove thereof at one side of the collar.

Interposed between an annular shoulder 27 on the plate 19 and the collar 23, is a heavy coiled spring 28 of conoidal form, having a coil of small diameter to engage the collar and coils of increasing diameter the outer one of which is the largest and rests against the plate 19. This spring, when in operative position is under compression and thus exerts a force to hold the collar moved inwardly, which inward movement is resisted by the levers 15 turning upon their pins with their cam surfaces in contact with the surfaces 22 on the master ring 12 and plate 19, and thus the full force of said spring tends to turn said levers and force said ring away from the plate to clamp the friction members 4, 5 and 6 between the surface 3 of the fly wheel and the master ring to frictionally hold the ring 6 and transmit motion from the fly wheel to the shaft. The surfaces 22 are continuous around the master ring and plate and the cam surfaces of the ends of the levers 15 are such that the friction members will be forced into firm frictional engagement before said levers are turned to the limit of their inward swinging movement and the extreme ends of said cam surfaces come into contact with the surfaces on the ring and plate, and this wedging action of the cams may be increased at will by turning the plate 19 to adjust the several levers 15 toward the master ring. Wear of the friction rings is thus provided for and as the surfaces 22 are continuous, the turning movement of the plate is permissible and this movement changes the place of contact of the cams with the master ring, thus presenting a new wearing surface of the ring each time the plate 19 is adjusted.

To facilitate the turning of the plate 19 and adjustment thereof relative to the master ring, said plate is formed with a plurality of outwardly projecting lugs 29 formed by cutting the sheet metal outwardly from its inner edge and bending the partially severed portions outward. By the use of a bar or other tool the plate may be turned by engaging one end of the bar under one of the lugs and using the shaft as a fulcrum. The plate is held in the position to which it is adjusted by means of a flat spring 30 secured to the ring 20 and adapted to engage a series of notches 31 in the outer angle formed by the shoulder 27 of the plate.

The sleeve 24 is provided with an antifriction bearing 32 on its outer end adapted to carry a collar 33 by means of which the sleeve may be moved endwise against the action of the spring 28, the usual foot lever, not shown, being employed to engage the collar for moving the same.

Obviously, changes may be made in the form and arrangement of parts without departing from the spirit of the invention, and I do not therefore wish to limit myself to the particular construction shown.

What I claim is:—

1. In a device of the character described, the combination with a driving member, a driven member and a plurality of friction members forming an operative connection between said driving and driven members, of a carrying member having a peripheral screwthread to engage a screwthread on the driving member and arranged in opposed and spaced relation to said friction members, said carrying member being formed with an internal spring seat and external notches, ears on the carrying member, a plurality of levers pivotally attached to said ears and formed to engage one of said friction members, means for engaging the inner ends of said levers, a spring engaging said means and seated on said seat, outwardly extending lugs on the carrying member, and a spring to engage the notches in said carrying member and hold said member against turning.

2. In a clutch, the combination with axially-alined drive and driven members, of a recessed housing on said drive member, coöperating friction disks secured respectively to said drive and driven members and located within said housing, a bearing on said housing opposed to said disks, a double cam between said disks and opposed bearing and provided with a radial inwardly projecting actuating arm, a pivot engaging a slotted bearing in said double cam for retaining the latter from radial movement, and a sleeve slidable upon said driven member for engaging said radial arm to actuate said cam.

3. In a clutch, the combination with axially-alined drive and driven members, of a recessed housing mounted on said drive member, an annular cap member for partly closing said recess, coöperating friction disk members secured respectively to said drive and driven members within said recess, an annular clamping member for said coöperating disk members, a double cam arranged between said annular clamping member and said cap member and provided with a radial inwardly extending actuating arm, a pivot engaging a slotted bearing in said double cam member and secured to said cap member to prevent radial movement of said cam, and a slidable sleeve on said driven member engaging said radial arm to actuate said cam.

4. In a clutch, the combination with axially alined drive and driven members, of a recessed housing secured to the drive member, coöperating friction disks within the recess of said housing and respectively connected thereto and to the driven member, an annular thrust member adjacent to said disks, an annular cap member for partially closing the recess in said housing, a double cam member arranged between said cap member and annular thrust member, having a pivotal attachment to one of said members, preventing radial movement while permitting free lateral movement, an inwardly-extending radial arm on said double cam member, a sleeve slidable on said driven member and extending into the recess of said housing, said sleeve being provided with a groove for engaging the inner end of said radial arm and also provided with an annular shoulder, a conical spring having its smaller end engaging said annular shoulder on said sleeve, and a flange on said cap member for engaging the large end of said spring.

5. In a clutch, the combination with axially alined drive and driven members, of a recessed housing secured to said drive member, coöperating friction disks respectively connected to said drive and driven members and located within the recess of said housing, a bearing on said housing opposed to said disks, a floating cam intermediate said disks and opposed bearing having an inwardly-extending radial arm, means constraining said cam to rotate with the driving member, and a slidable sleeve on the driven member for rotatively engaging said radial arm for actuating the same to engage or disengage said friction disks.

6. In a clutch, the combination with axially alined drive and driven members, of a recessed housing on said driving member, coöperating friction disks secured respectively to said drive and driven members and located within said housing, a bearing on said housing opposed to said disks, a double cam between said disks and opposed bearing and provided with a radial inwardly projecting actuating arm, a pivotal support for said cam carried by the drive member permitting a lateral play of the cam, between said disks and bearing, and a sleeve slidable upon said driven member for engaging said radial arm to actuate said cam.

7. In a clutch, the combination with axially-alined drive and driven members, of a recessed housing mounted upon said drive member, an annular cap member for partially closing said recess, coöperating friction disk members secured respectively to said drive and driven members within said recess, an annular clamping member for said coöperating disk members, a double cam arranged between said annular clamping member and said cap member and provided with a radial inwardly-extending actuating arm, a pivotal support for said cam carried by said cap member preventing radial movement of the cam and permitting a limited movement parallel to the clutch axis, and a slidable sleeve on said driven member engaging said radial arm to actuate said cam.

In testimony whereof I affix my signature in the presence of two witnesses.

HOMER L. WORBOIS.

Witnesses:
ANNA M. DORR.
LEWIS E. FLANDERS.